Figures 1, 2:
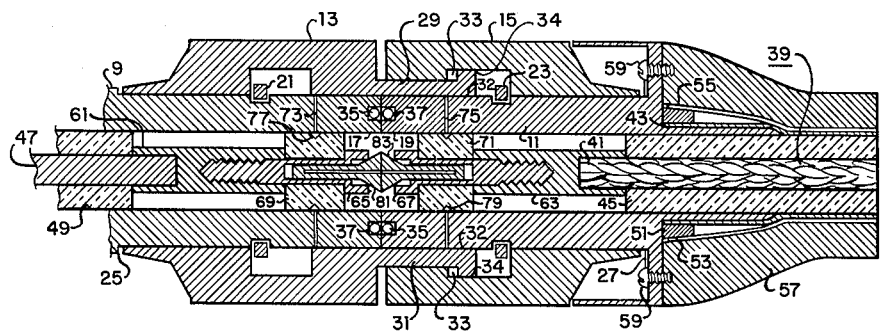

April 5, 1966　　　A. S. BADGER　　　3,245,028
CONNECTORS
Filed Feb. 17, 1964

INVENTOR
ANTHONY S. BADGER
BY　　Q. C. Smith
AGENT

United States Patent Office 3,245,028
Patented Apr. 5, 1966

3,245,028
CONNECTORS
Anthony S. Badger, Palo Alto, Calif., assignor, by mesne assignments, to Amphenol Corporation, a corporation of Delaware
Filed Feb. 17, 1964, Ser. No. 345,218
4 Claims. (Cl. 339—90)

This invention relates to sexless connectors for cylindrical pipes or lines such as electrical coaxial transmission lines.

Terminal connectors of male and female types have been in common use for joining the ends of tubular members such as coaxial transmission lines in electrical apparatus. Considerably difficulty and inconvenience are frequently encountered, however, in using connectors of this type because of the necessity of mating male and female ends of the members to be joined.

Accordingly it is an object of the present invention to provide a sexless connector for tubular or coaxial members.

It is another object of the present invention to provide a sexless connector which is quickly connected and disconnected without the aid of tools and which has high mechanical rigidity and strength.

It is also an object of the present invention to provide a sexless connector which locks the members to be joined in accurate axial alignment.

It is still another object of the present invention to provide an improved sexless connector.

In accordance with the illustrated embodiment of the present invention, a rotatable barrel is held in fixed axial position near the planar end of each of the members to be joined. These barrels are identical and include a pair of protruding prongs having inclined locking tapers which engage radial surfaces in the mating barrels. Opposite rotation of the barrels produces an axial engaging force on the members to be joined. Surfaces of the protruding prongs are referenced against cylindrical surfaces of the mating barrels to provide coaxial alignment of the members to be joined. The members to be joined may be locked together in any relative angular position about the common axis of alignment.

Other and incidental objects of the present invention will be apparent from a reading of this specification and an inspection of the accompanying drawing in which:

FIGURE 1 is a sectional view of an assembled connector according to the present invention, and FIGURE 2 is a perspective view of the connector in accordance with the present invention.

Referring to FIGURES 1 and 2, there is shown a pair of tubular members 9, 11 such as the outer conductors of a coaxial line which are to be joined together. Each of the members carries a barrel 13, 15 which is rotatable about the respective member but which is fixed thereon in an axial position near the end 17, 19 of the member by a snap ring 21, 23 on one side and by a shoulder 25, 27 on the other side. The barrels 13, 15 are identical and each includes a diametrically-opposed pair of prongs (only prongs 29, 31 on barrel 13 appear in the sectional view of FIGURE 1) which project axially beyond the ends 17, 19 of the members to be joined. These prongs pass axially through regions of large diameter in the front portions of the mating barrels as the members to be joined are brought together. The inner cylindrical surfaces 32 of the prongs provide axial alignment for the members 9, 11 as they are brought together. A helically-tapered radial surface 33 on each of the prongs engages a radial surface on the inside of a mating barrel in a region thereof where the front portion is of reduced diameter. Relatively opposite rotation of the barrels 13, 15 (or rotation of one barrel only) produces an axial engaging force which urges the ends 17, 19 of the members 9, 11 together. A suitable resilient O-ring gasket 35 of such composition as silver-plated tiny copper balls in potting resin is disposed within the annular groove 37 in the mating ends 17, 19 of the members to be joined for decreasing leakage of electrical signal through the joint.

In the illustrated embodiment of the invention, member 11 is attached to a flexible line such as a coaxial cable 39 and member 9 is part of a rigid fixture such as the output terminal of a signal source. The cable 39 includes a wound-strand center conductor 41 which is held in coaxial alignment with the outer shield conductor 43 by dielectric material 45.

The outer shield 43 is held in electrical contact with the member 11 by the jam-tapered ring 51 which is split longitudinally and which is disposed between the shield 43 and the outer insulating layer 53 of the cable 39. The mating tapered aperture 55 in the housing 57 imparts force through the outer layer 53 to the ring 51 which thereby tightens the shield conductor 43 around member 11 as the housing 57 is pulled axially against the shoulder 27 of the member 11 by the bolts 59. This clamps the cable 39 rigidly to the member 11 and forms a fluid-tight seal having high tensile strength.

The center conductor 47 of the member 9 is held in coaxial alignment with the outer conductor by dielectric material 49. Each of the center conductors 41, 47 is connected to a conductive element 61, 63 as by soldering or crimping. A collet holder 65, 67 passes through a dielectric spacer 69, 71 and screws into the element 61, 63, thereby aligning the element and holding it axially and radially rigid within the member 9, 11. Resinous potting compound is injected through holes 73, 75 into the grooves 77, 79 about the spacers 69, 71 to hold them in place. A collet 81, 83 having a tapered end region and having a plurality of intersecting axial splits is slidably mounted in the collet holder. The tapered end regions on each of the split collets acts against the edge of the collet holder to impart axial motion to the collet as the collet finger expands resiliently outward. This urges the collets together to make good electrical contact between center conductors of the lines to be joined. The outer dimension of the collets and the inner dimension of the aperture in the collet holders are so chosen that the collet fingers expand sufficiently to engage the walls of the apertures when the sections of the connector are disconnected, thereby preventing the collet from falling out of the holder.

I claim:

1. In a connector for joining conductors, contact means for a conductor in one section of said connector comprising:
   an element connected to said conductor and having a longitudinally cylindrical bore therein;
   a member slidably disposed within the bore of said element, the member having a longitudinal split along a portion of the length thereof for providing diametrical expansion of said member; and
   means on said member responsive to diametrical expansion thereof for urging said member outwardly from said bore.

2. In a connector for joining conductors, contact means for a conductor in one section of said connector comprising:
   an element connected to said conductor and having a longitudinally cylindrical bore therein;
   a cylindrical member of resiliently expandable diameter slidably disposed within the bore of said element; and
   a tapered surface on said member disposed to engage an end of the cylindrical bore for urging said member outwardly from said bore in response to diametrical expansion of said member.

3. Contact means as in claim 2 wherein the diameter of the cylindrical bore in said element is smaller than the maximally expanded diameter of said member for impeding further outward-sliding motion of said member within said bore by engagement of the inner surface of the cylindrical bore and an outer surface of the expanded member after a predetermined amount of axial movement of said member outwardly from said bore.

4. A sexless connector for joining a pair of members and comprising for each of said members:
   a barrel rotatably mounted on the member;
   a plurality of prongs on the front portion of the barrel protruding axially beyond the end of said member; and
   a helically-tapered radial surface on each of said prongs for engaging a radial surface of a mating barrel whereby relative rotation of the barrels imparts an axial engaging force upon the ends of said members;
   at least one of said members having
   an element disposed coaxially within said member about the longitudinal axis thereof;
   said element having a longitudinal aperture therein;
   and resilient means disposed within said aperture having an end protruding beyond the end of said element;
   said resilient means includes a collet having a longitudinal split along a portion of the length thereof and having at least one tapered end;
   said tapered end varying in diameter between values larger and smaller than the diameter of the aperture in said element and being disposed to engage an end of said apertures in the element.

References Cited by the Examiner
UNITED STATES PATENTS

| | | | |
|---|---|---|---|
| 2,171,726 | 9/1939 | Howell | 339—47 |
| 3,040,288 | 6/1962 | Edlen et al. | 339—117 X |
| 3,129,993 | 4/1964 | Ross | 339—49 |

PATRICK A. CLIFFORD, *Primary Examiner.*

W. DONALD MILLER, *Examiner.*